United States Patent [19]

Angell et al.

[11] 4,385,392

[45] May 24, 1983

[54] MODEM FAULT DETECTOR AND CORRECTOR SYSTEM

[76] Inventors: Gary W. Angell, 37 Lanark Dr., Westwood, Mass. 02090; C. Kenneth Miller, 85 Revolutionary Rd., Concord, Mass. 01742

[21] Appl. No.: 288,980

[22] Filed: Jul. 31, 1981

[51] Int. Cl.³ .............................................. H04L 1/22
[52] U.S. Cl. .................................. 375/8; 340/825.01; 371/8; 375/10
[58] Field of Search .................. 371/7, 8; 340/825.01; 455/8, 49, 50, 52; 375/8, 10, 40

[56] References Cited

U.S. PATENT DOCUMENTS

| | | | |
|---|---|---|---|
| 3,588,824 | 6/1971 | Barker | 340/825.01 |
| 4,245,342 | 1/1981 | Entenman | 371/8 |
| 4,264,893 | 4/1981 | Hutch | 340/825.01 |
| 4,271,511 | 6/1981 | Manber et al. | 340/825.01 |

*Primary Examiner*—Benedict V. Safourek
*Attorney, Agent, or Firm*—Joseph S. Iandiorio

[57] ABSTRACT

A modem fault detector and corrector system including: a first modem including a first transmitter and first receiver and a second modem including a second transmitter and second receiver; switch means for selectively switching the first and second transmitters on and off of a transmission line; and the first and second receivers on and off of a receiver line; and for connecting one of the receivers with the output of either of the first and second transmitters; means for monitoring the status of each of the modems; means for correlating transmit data with receive data; means for sequencing the switch means to enable the means for correlating to compare transmit data selectively with the output of the first transmitter and the second transmitter; and means, responsive to the means for monitoring, the means for correlating, and the means for sequencing for detecting a malfunction in one of the first modem, second modem and transmission-receiver lines and directing the switch means to replace a malfunctioning on-line modem with the off-line modem.

6 Claims, 7 Drawing Figures

MODEM FAULT DETECTOR AND CORRECTOR SYSTEM

FIELD OF INVENTION

This invention relates to a modem fault detector and corrector system, and more particularly to such a system which monitors the operation of an on-line modem and a spare modem, and upon determining a malfunction in the on-line modem replaces it with the spare modem.

BACKGROUND OF INVENTION

Modems are used in point-to-point and multi-drop configurations. With increasing costs and data transmission burdens, the multi-drop approach has been used more frequently. In such configurations, when a transmitter or receiver fails in the "on" or short-circuit condition, the entire transmitter-receiver line goes down along with all its drops. The problem becomes more complex when one or more of the modems themselves supports another multi-drop line. When a line fails, it is often difficult to determine which modem is at fault and what is the basis of the problem. The modems may be in different locations in different parts of the country, and a modem may feed one or more additional modems. To help alleviate this problem, network controllers are introduced. However, they are quite expensive. They use side channels, frequency division multiplexed to interrogate modems and find which modem is at fault and diagnose the problem. The interrogation is done over the telephone line, but separately from the data. In cases where the first modem feeds other modems, the first modem must be provided with an interface or link to allow its other modems to be interrogated through it. One of the major shortcomings of network controllers is that they provide only the indication of the fault; a human operator must determine how to fix the fault. Correction is not normally automatic. Usually there is not a human monitor in continual attendance, so there may be a substantial interval between the time the fault is found and the time the human monitor sees the fault indication and moves to correct it. Further, the human monitor must be trained, knowledgeable person skilled in network problems.

Network controllers have been successfully used in larger systems where their cost is a small part of a much larger system, but their cost would overwhelm a small, simple, point-to-point system, especially those that are used in the less expensive, slower modems. In addition, the network controller itself may fail, and then it is truly difficult to determine the cause of the problem.

SUMMARY OF INVENTION

It is therefore an object of this invention to provide an improved, simple, inexpensive modem fault detector and corrector system which automatically detects a fault and corrects it without human intervention.

It is a further object of the invention to provide such a system which is simple, inexpensive, and is economically compatible with simple point-to-point and multi-drop configurations.

It is a further object of this invention to provide such a system which distributes the fault detection and correction so that the network of lines and modems is not dependent upon a single monitoring component.

The invention features a modem fault detector and corrector system comprising a first modem including a first transmitter and a first receiver, and a second modem including a second transmitter and a second receiver. Switch means selectively switch the first and second transmitters on and off of a transmission line and selectively switch the first and second receivers on and off of a receiver line, as well as connect one of the receivers with the output of either of the first and second transmitters. There are means for monitoring the status of each of the modems and means for correlating transmit data with receive data. Means are also provided for sequencing the switch means to enable the means for correlating to compare transmit data selectively with the output of the first transmitter and the second transmitter. There are means responsive to the means for monitoring, the means for correlating, and the means for sequencing, for detecting a malfunction in one of the first modem, second modem, and transmission-receiver lines, and directing the switch means to replace a malfunctioning on-line modem with the off-line modem.

In a preferred embodiment, the means for monitoring the status of each modem includes a comparator circuit for detecting the signal quality signal, the data carrier detect signal, and the clock signal from each modem. Multiplexer means are also provided for selectively submitting the signals from one modem at a time to the comparator circuit. The means for correlating includes means for varying the delay between transmit data and receive data, and comparator means for indicating a match between the receive data and transmit data. In addition, there are latch means for fixing the delay between the receive and transmit data upon the indication of a match. The means for varying the delay may include a variable delay register and a counter for cyclically varying the delay of the delay register. There is a search clock for driving the counter. The means for sequencing the switch means may include a program counter and a ROM driven by the program counter to operate the switch means in a predetermined pattern. The means for detecting may include a ROM responsive to the status of each modem, the correlation of the transmit and receive data, and the condition of the switch means. Parts of the same ROM may be used for the means for sequencing and the means for detecting.

DISCLOSURE OF PREFERRED EMBODIMENT

Other objects, features and advantages will occur from the following description of a preferred embodiment and the accompanying drawings, in which.

Figure 1:
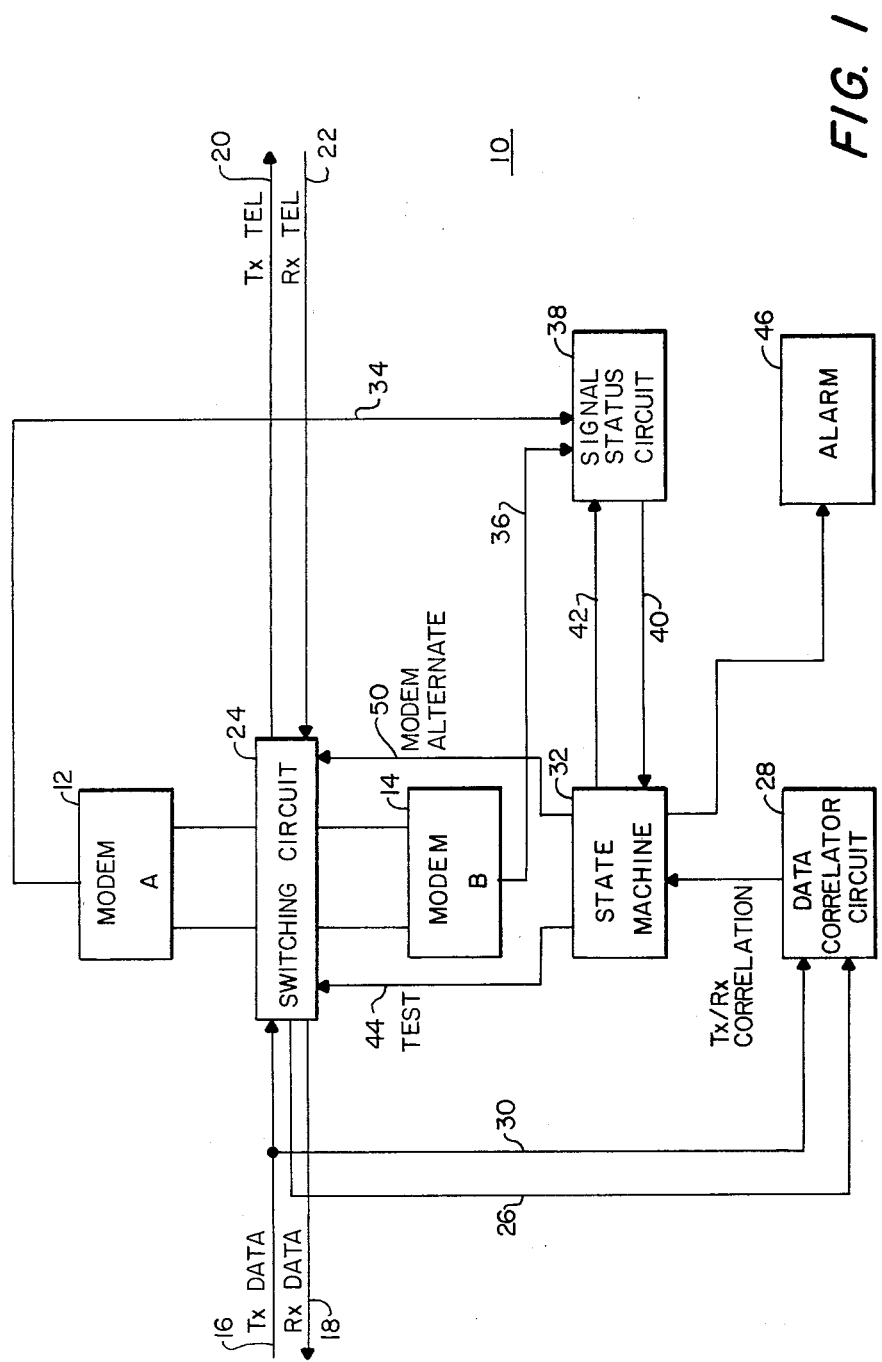
FIG. 1 is a block diagram of a modem fault detector and corrector system according to this invention.

There is shown in FIG. 1 a modem fault detector and corrector system 10 including two modems, modem A, 12, and modem B, 14, one of which may be the on-line modem and the other the off-line or spare modem. Modems 12 and 14 are interconnected between the transmit data line 16 and receive data line 18, and the transmit telephone line 20 and receive telephone line 22 by means of switching circuit 24. Switching circuit 24 interconnects one of modems 12 and 14 directly between data lines 16, 18 and telephone lines 20, 22, to convert the data format to an audio format compatible with telephone line transmission. Each modem 12, 14, includes a transmitter and a receiver. The receiver of the off-line or spare modem is connected by switching circuit 24, through line 26, to data correlator circuit 28, which compares that receive data with the transmit data on line 30 from transmit data line 16 and indicates the matching or mismatching of the two to state machine 32. Modems 12 and 14 are conventional modems and provide control and clock signal outputs, such as the signal quality signal, the data carrier detect signal, and clock signal, over lines 34 and 36, respectively, to signal status circuit 38. One of those sets of control signals on lines 34 and 36 is delivered on line 40 to state machine 32 in response to a signal on line 42.

Periodically, state machine 32 in the test mode provides signals on line 44 to operate switching circuit 24 to variously interconnect the off-line or spare modem receiver with the on-line and off-line modem transmitters. At each step of the switching, the various outputs from data correlator circuit 28 are reviewed in order to detect malfunctions in the modems. Upon malfunctions being determined on the grounds of improper control signals, as determined by signal status circuit 38, or inequality of data correlation, or the lack of determination of correlation from data correlator circuit 28, state machine 32 provides an indication to alarm circuit 46. This may be merely an indication that a fault has occurred, or it may indicate the fault that has occurred, the identification of the reason for the fault, and may also indicate whether or not the fault has been corrected. Alarm circuit 46 may be strictly a local alarm circuit or it may include means for transmitting the various alarm signals to a remote station or stations. Similarly, alarm circuit 46 may include means for receiving alarms from remote stations.

State machine 32 may provide, at a lesser frequency than the testing cycles on line 44, a modem alternate signal on line 50 which periodically swaps the modems so that the off-line modem becomes the on-line modem and the on-line modem becomes the off-line modem. In one embodiment, modem A may include on-line transmitter 60, FIG. 2, and on-line receiver 62; modem B may include off-line or spare transmitter 64 and off-line or spare receiver 66. Switching circuit 24 may include switch 70 for selectively connecting the output of either on-line receiver 62 or spare receiver 66 to receive data line 18 and switch 71 for interconnecting date correlator circuit 28 with either on-line receiver 62 or spare receiver 66. Switching circuit 24 also includes switch 72 for interconnecting transmit telephone line 20 with either on-line transmitter 60 or spare transmitter 64. Switching circuit 24 also includes switches 74, 76 and 78. Switch 74 connects either the output from on-line receiver 62 or the output from spare receiver 66 on line 80, to the receiver telephone line 22. Switch 78 interconnects the input to spare receiver 66 with either line 80 or with switch 76. Switch 76 connects the input to spare receiver 66 from either on-line transmitter 60 over line 82 or the output from spare transmitter 64.

Figure 2:
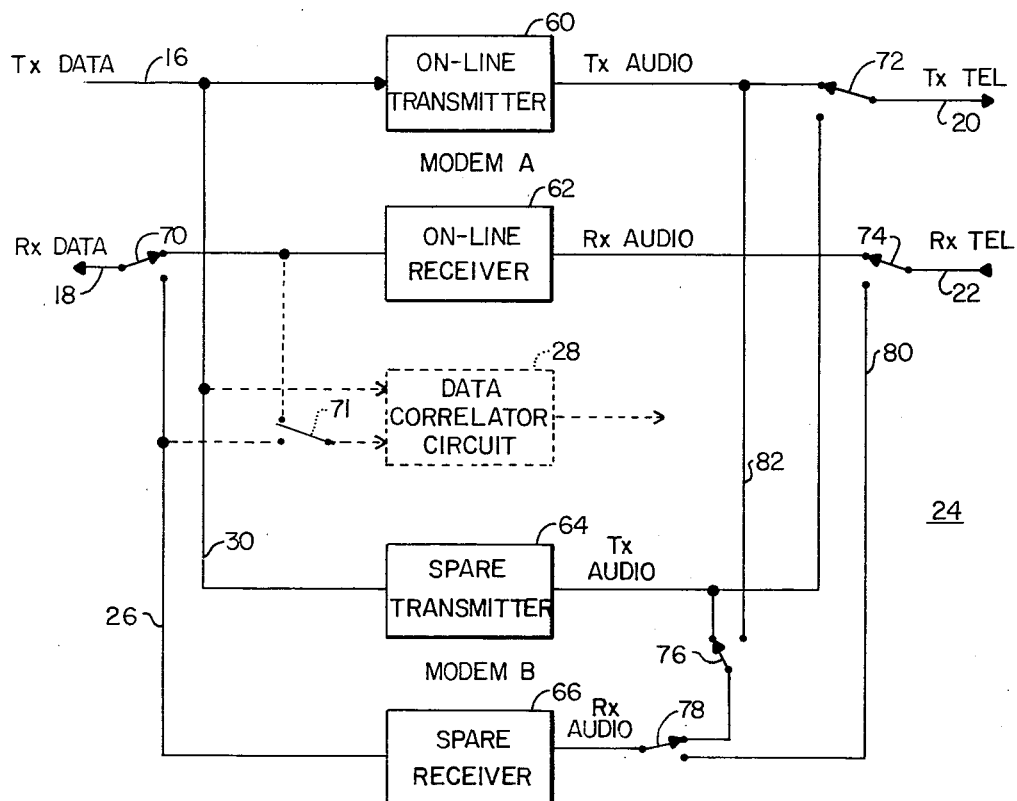
FIG. 2 is a schematic block diagram of the switching circuit shown in FIG. 1.

Initially, with the switches set as shown in FIG. 2, spare receiver 66 is receiving the output from spare transmitter 64. If at this time data correlator circuit 28 indicates a mismatch, then either spare receiver 66 or spare transmitter 64 is malfunctioning. If data correlator 28 indicates a match, then both spare transmitter 64 and spare receiver 66 are functioning properly. With switch 76 thrown to the other position, spare receiver 66 receives input from on-line transmitter 60. If at this time data correlator circuit 28 indicates a match, then on-line transmitter 60 is functioning properly. If, however, a mismatch is indicated by data correlator circuit 28, that indicates that on-line transmitter 60 is malfunctioning, if, as was previously indicated to be the case, the data correlation circuit indicated a match when spare receiver 66 was provided input from spare transmitter 64. To interchange the on-line modem A and spare modem B, it is only necessary to throw each of switches 70, 72, and 74 to the position opposite to that shown in FIG. 2.

Figure 3:
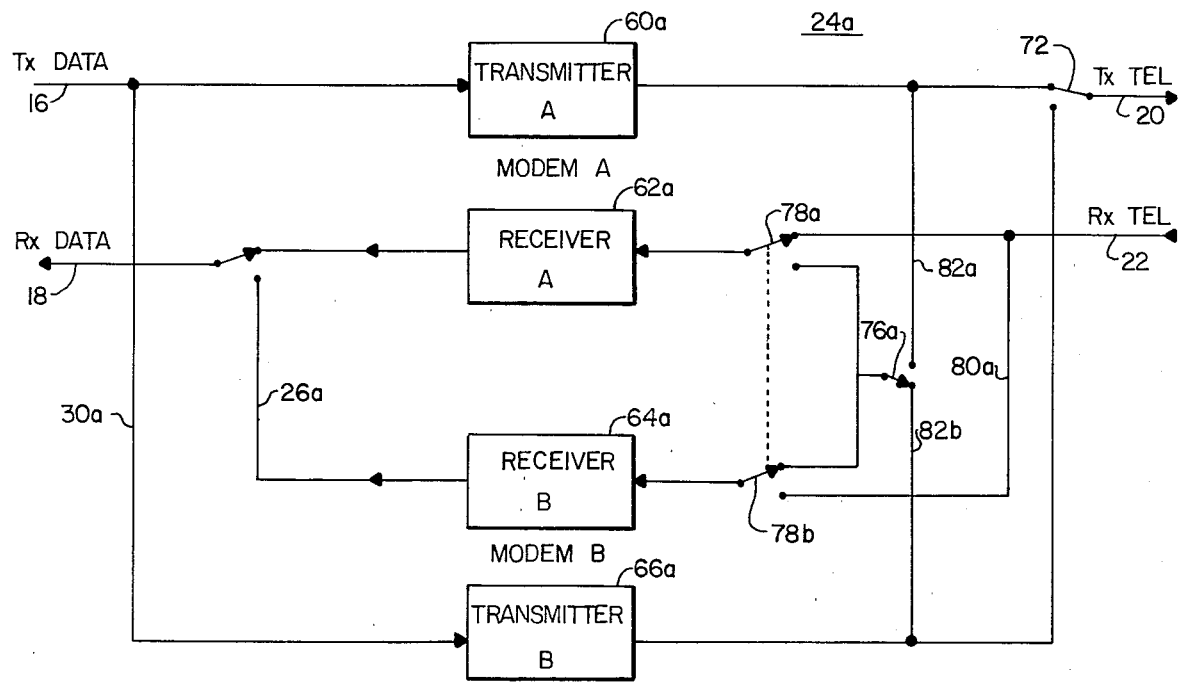
FIG. 3 is a schematic block diagram of an alternative switching circuit which may be used in FIG. 1.

Although in FIG. 2 modem A is shown specifically as the on-line transmitter and modem B as the off-line or spare transmitter, this is not a necessary limitation of the invention. For example, as shown in FIG. 3, switching circuit 24a may be rearranged so as to respond to periodic commands on line 50 from state machine 32 to interchange the on-line and off-line modems. In FIG. 2, switch 74 has been eliminated along with switch 78 and their functions have been combined to switches 78a and 78b. Switches 70 and 72 function as previously. Switches 78a and b operate to interconnect either receiver 62a or receiver 64a with telephone line 22, while interconnecting the other of those receivers with switch 76a. Switch 76a connects the selected receiver with either the output of transmitter 60a over line 82a or the output of transmitter 60b over line 82b. Periodically, for example every hour, switch 78a, b may have its position changed so that the modems interchange their on-line and off-line posture.

Figure 4:
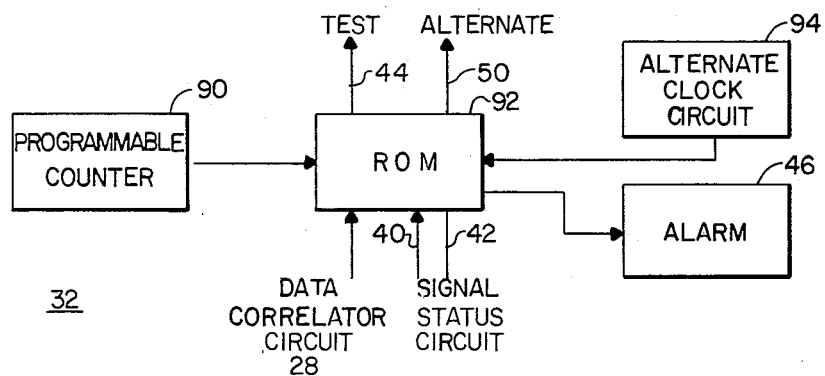
FIG. 4 is a block diagram of the state machine of FIG. 1.

State machine 32 may be implemented by an Intel 2731 ROM and a 74LS163 programmable counter. ROM 92 provides an alternate signal on line 50 periodically, for example every hour, and is driven by alternate clock circuit 94. The test command signals on line 44 to operate switches 70, 72, 74, 76, and 78 occur as ROM 92 is addressed in sequence by the output from programmable counter 90, FIG. 4. Separately, ROM 92 responds to the particular switch test configuration commanded on line 44 and the input from data correlator circuit 28, as well as that from signal status circuit 40, to determine whether or not there is a malfunction of a modem, which modem is malfunctioning, and the reason for the malfunction. The configuration of the switches at the time that the fault is detected in conjunction with the identification of the fault enables the ROM logic to further operate switching circuit 24 to remove the on-line malfunctioning modem and replace it with the off-line modem in accordance with the flow diagram of FIG. 7.

Figure 5:
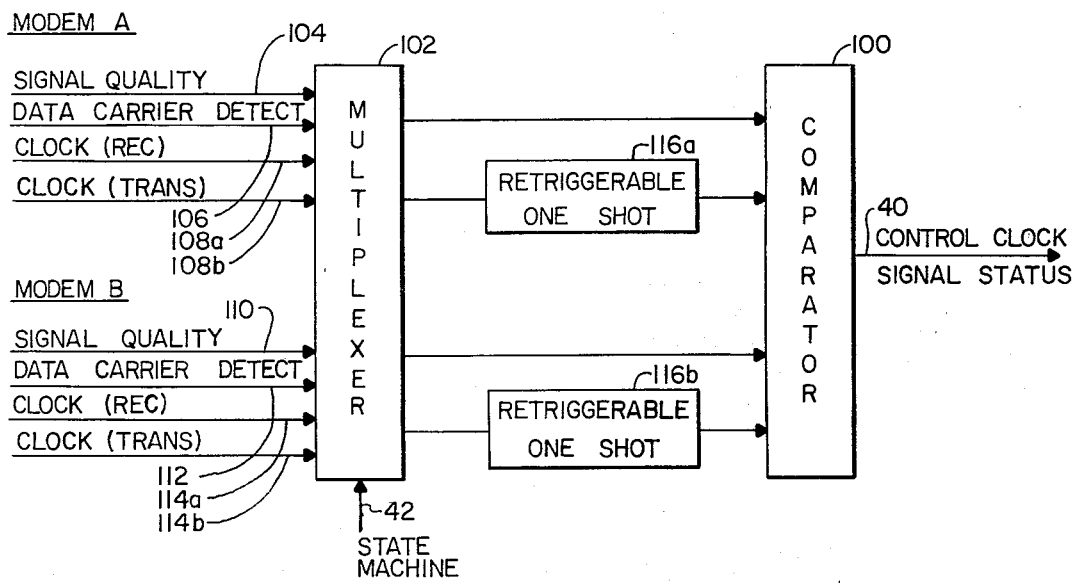
FIG. 5 is a block diagram of the signal status circuit of FIG. 1.

Signal status circuit 38 includes comparator 100, FIG. 5, and multiplexer 102. Multiplexer 102 receives the signal quality signal, data carrier detect signal, and transmit and receive clock signals from modem A on lines 104, 106, 108a and 108b, respectively. The same signals are received from modem B on lines 110, 112, 114a and 114b. These signals are typically provided by each modem in the form EIA RS-232C signals and are converted to TTL levels for introduction to multiplexer 102. An input on line 42 from state machine 32 selects the outputs from one of the modems for multiplexer 102 to provide to comparator 100. These signals are compared bit for bit with the proper signals, and when a match occurs an indication is made on output line 40 from comparator 100. Retriggerable one shot circuits 116, 118 respond to transitions from clock signals from synchronous modems.

Figure 6:
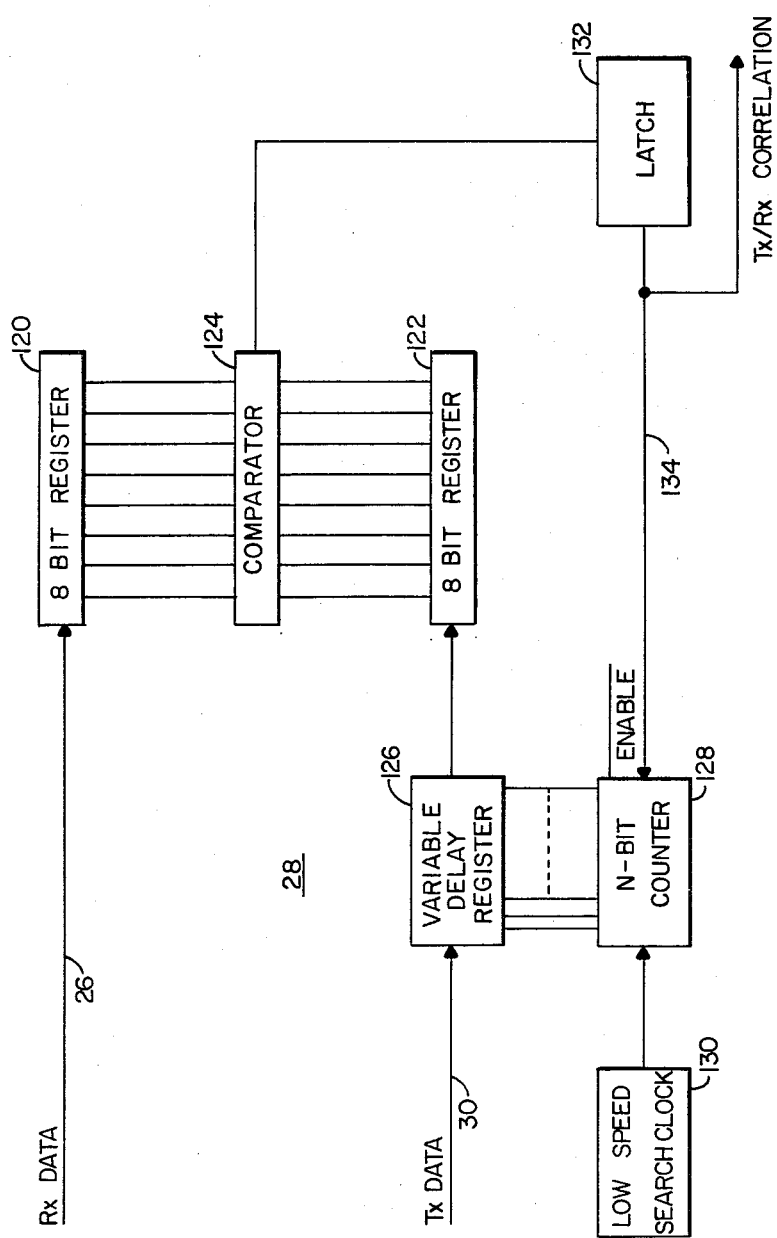
FIG. 6 is a block diagram of the data correlator circuit of FIG. 1.

Data correlator circuit 28 includes two eight-bit registers 120, 122, FIG. 6, which feed comparator 124 in parallel. Receive data on line 26 is fed to register 120, while transmit data on line 30 is fed through variable delay register 126 before it reaches eight-bit register 122. The delay introduced by register 126 is varied by n-bit counter 128 driven by a low-speed search clock 130. As soon as comparator 124 detects a match between the receive data and delayed transmit data, a signal is provided to latch 132 which provides a signal on line 134 to disable counter 128 and so fix register 126 at the present delay. The signal on line 134 also constitutes the TX/RX correlation signal to state machine 32. If the match of the receive data and transmit data on lines 26 and 30 should cease for any reason, latch circuit 132 will be released and n-bit counter 128 will once again respond to low-speed search clock 130 to vary the delay introduced by register 126 and thus to the transmit data 30 delivered to register 122.

Figure 7:
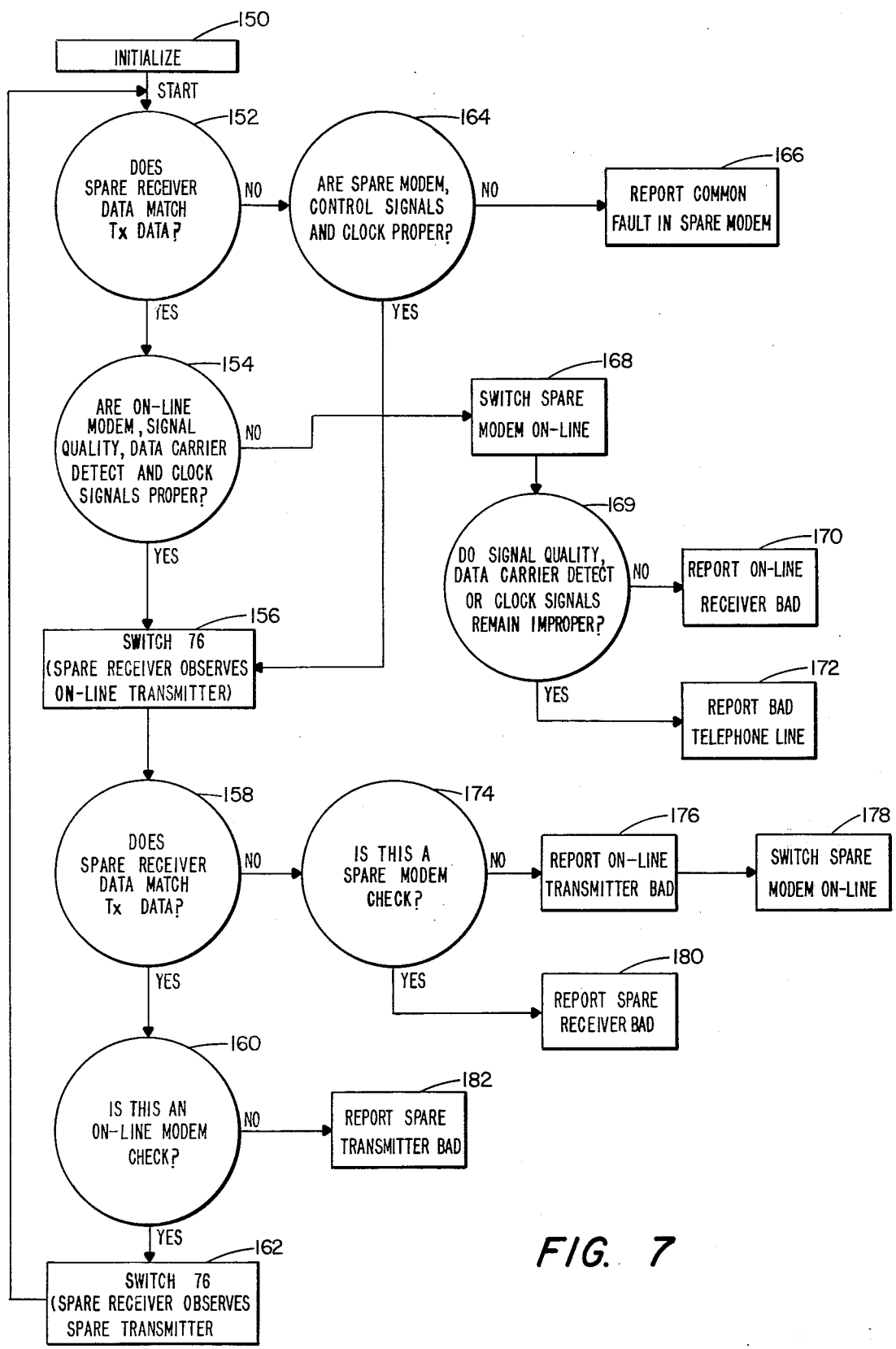
FIG. 7 is a flow chart for the ROM of FIG. 4.

The logic operation of ROM 92 may be more clearly understood with respect to the flow chart of FIG. 7. The system is initialized, step 150, and then the inquiry is made, step 152, as to whether the spare receive data matches the transmit data. If the response is affirmative, then the next inquiry is made, step 154, as to whether the on-line modem's signal quality signal, data carrier detect signal, and clock signals are proper. If the answer is affirmative, then in the next step, 156, switch 76, FIG. 2, is thrown and the spare receiver now observes the on-line transmitter. In the next step, 158, the inquiry is made: "Does the spare receiver data match the transmit data?" If the answer is affirmative, then in step 160 the inquiry is made: "Is this an on-line modem check?" If it is, then in step 162, FIG. 6, switch 76 is thrown again and the spare receiver once again observes the spare transmitter and then the loop returns to step 152.

Alternatively, at step 152 if the response is negative, then in step 154 the inquiry is made: "Are the spare modem control signals and clocks proper?" By control signals is meant the signal quality signal and data carrier detect signals, typically. If the answer is negative, then in step 166 a common fault in the spare modem is reported. If the answer if affirmative, the logic moves directly to step 156, in which switch 76 is thrown. In step 154, if the signal quality signal, data carrier detect signal, and clock signals are not proper, the spare modem is switched off-line, step 168, and the inquiry is made: "Do the signal quality, data carrier detect, and clock signals remain improper?", step 169. If the answer is negative, then the on-line receiver is reported faulty in step 170. The logic flow assumes that upon initialization in step 150 all modems are operating. If this may not be the case then a separate logic flow will have to be added to assure complete response. If the response is affirmative the telephone line is reported faulty in step 172.

In step 158, if the spare receiver data does not match the transmit data, an inquiry is made as to whether this is a spare modem check in step 174. If it is not, the on-line transmitter is reported faulty in step 176 and the spare modem is switched on-line in step 178. If this is not a spare modem check then the spare receiver is reported faulty. In step 160, if it is determined that there is not being conducted an on-line modem check, then the spare transmitter is reported faulty in step 182.

Other embodiments will occur to those skilled in the art and are within the following claims.

What is claimed is:

1. A modem fault detector and corrector system for connection with a transmission line carrying transmit data and a receiver line carrying receive data, comprising:
   a first modem including a first transmitter and first receiver and a second modem including a second transmitter and second receiver;
   switch means interconnected with said first and second modems for selectively switching said first and second transmitters on and off of a transmission line and said first and second receivers on and off a receiver line, and for connecting one of said receivers with the output of either of said first and second transmitters;
   means for monitoring the status of each of said modems;
   means responsive to said switch means for correlating the transmit data with the receive data;
   means interconnected with said switch means for sequencing said switch means to enable said means for correlating to compare transmit data selectively with the output of said first transmitter and said second transmitter; and
   means, responsive to said means for monitoring, said means for correlating, and said means for sequencing, for detecting a malfunction in one of said first modem, said second modem and said transmission and receiver lines and directing said switch means to replace a malfunctioning on-line modem with the off-line modem.

2. The system of claim 11 in which each said modem provides status signals including a signal quality signal, data carrier detect signal, and clock signal, and said means for monitoring the status of each modem includes a comparator circuit for detecting the signal quality signal, data carrier detect signal, and clock signal from each modem, and multiplexer means for selectively submitting said signals from one of said modems to said comparator circuit.

3. The system of claim 1 in which said means for correlating includes means for varying the delay between transmit data and receive data, comparator means for indicating a match between the receive data and transmit data, and latch means for fixing the delay between the receive and transmit data upon the indication of a match.

4. The system of claim 3 in which said means for varying the delay includes a variable delay register, a counter for cyclically varying the delay of said delay register, and a search clock for driving said counter.

5. The system of claim 1 in which said means for sequencing said switch means includes a program counter, and a ROM driven by said program counter to operate said switch means in a predetermined pattern.

6. The system of claim 1 in which said means for detecting includes a ROM responsive to the status of each modem, the correlation of the transmit and receive data, and the condition of said switch means.

* * * * *